United States Patent [19]

Montfort

[11] Patent Number: 4,928,406

[45] Date of Patent: May 29, 1990

[54] SLIDE DEVICE FOR ADJUSTING THE RELATIVE ELEMENTS OF A SKI BOOT

[75] Inventor: Benoit Montfort, Annecy, France

[73] Assignee: Salomon S. A., Annecy Cedex, France

[21] Appl. No.: 291,166

[22] Filed: Dec. 28, 1988

[30] Foreign Application Priority Data

Dec. 28, 1987 [FR] France .................. 87 18507

[51] Int. Cl.⁵ .............................................. A43B 5/04
[52] U.S. Cl. ...................................... 36/117; 36/121; 403/290
[58] Field of Search .................................. 36/117–121; 403/289, 290, 297, 354; 24/304.1, 704.2, 337, 612; 292/19

[56] References Cited

U.S. PATENT DOCUMENTS

| | | | |
|---|---|---|---|
| 3,612,474 | 10/1971 | Strohl, Jr. .................. | 403/290 X |
| 4,379,370 | 4/1983 | Balbinot ..................... | 36/121 |
| 4,455,768 | 6/1984 | Salomon ..................... | 36/121 |
| 4,577,420 | 3/1986 | Petrini et al. ................ | 36/117 |
| 4,653,205 | 3/1987 | Koch .......................... | 36/117 |

FOREIGN PATENT DOCUMENTS

| | | | |
|---|---|---|---|
| 38197 | 11/1927 | Denmark ..................... | 403/290 |
| 217423 | 4/1987 | European Pat. Off. ......... | 36/117 |
| 241840 | 10/1987 | European Pat. Off. ......... | 36/117 |
| 1811334 | 6/1970 | Fed. Rep. of Germany .... | 36/121 |
| 2414439 | 10/1975 | Fed. Rep. of Germany .... | 36/117 |
| 2590129 | 5/1987 | France ....................... | 36/119 |
| 2604067 | 3/1988 | France ....................... | 36/117 |

*Primary Examiner*—James Kee Chi
*Attorney, Agent, or Firm*—Pollock, Vande Sande & Priddy

[57] ABSTRACT

The slider (81 to 873, 9, 91, 92) is unitary with one element, the guide track (72, 73) with a second element. The slider (81) comprises two flexible arms (82, 83) which contact and cooperate with the sides (72, 73) of the guide track. A control lever (9), jointed onto the slider (81) around an axis (91), has a projection (92) which, for the purpose of fixing the slider (81 to 83) in position, fits between the arms (82, 83) so as to hold them against the edges of the guide track (72, 73) when the lever (9) is set in the locked position. Complementary forms (10), which interlock in the locked position, are advantageously provided on the arms (82, 83) and the edges of the guide track (72, 73) in order to ensure positive positioning. The invention is applied in particular to the adjustment of the geometric and mechanical operating characteristics of ski boots, especially to those having a shaft jointed onto a shell base.

10 Claims, 4 Drawing Sheets

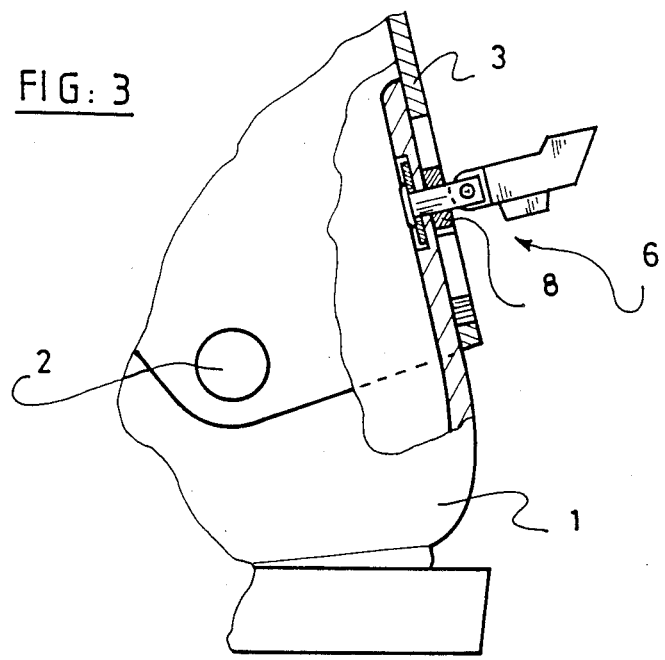
FIG. 3
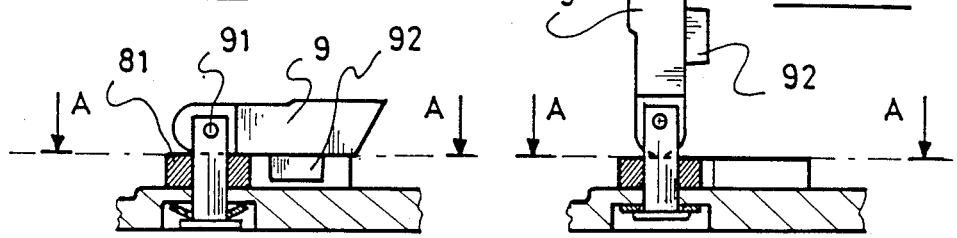
FIG. 4A    FIG. 4C
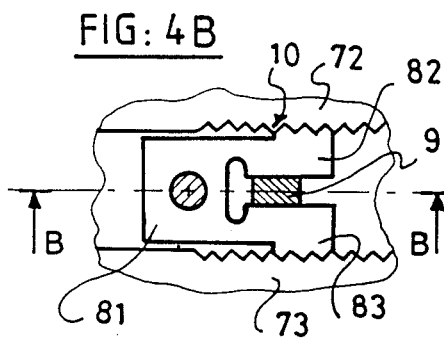
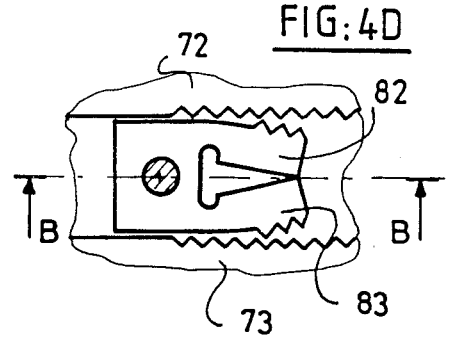
FIG. 4B    FIG. 4D

FIG: 5A
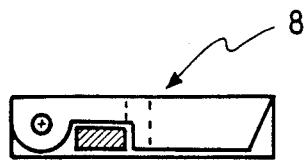
FIG: 5C
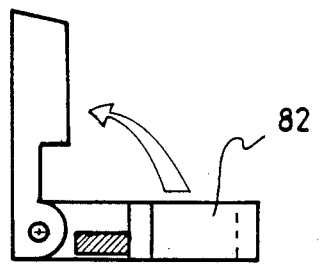
FIG: 5B
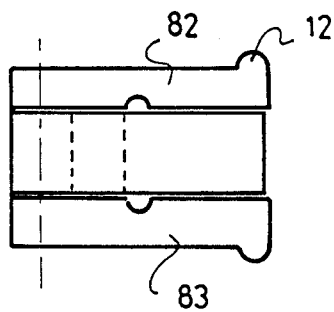
FIG: 5D
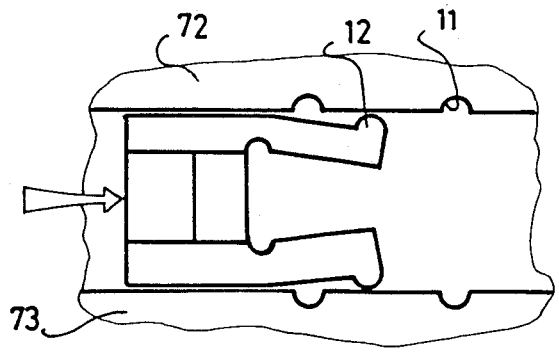

SLIDE DEVICE FOR ADJUSTING THE RELATIVE ELEMENTS OF A SKI BOOT

FIELD OF THE INVENTION

The present invention concerns a device having a slider equipped with a manual control piece which is fixed in position in a guidetrack.

BACKGROUND OF THE INVENTION

Frequently, the relative position of two elements which function together mechanically must be adjusted and fixed in the desired setting, as determined by the conditions in which they will be used. This is particularly true for some ski boots, one or several of whose mechanical operating characteristics may be adapted according to intended use and to the conditions under which the boots will be used. Although the in no way limited to this kind of specific usage, the invention will be described with reference to this particular technical area, and adaptation of the invention to other uses may be accomplished mutatis mutandis by those skilled in the art.

Modern ski boots are usually equipped with devices which permit adjustment of the relative positions of two of their component elements: one of these elements contains a guidetrack or slide in which a device or slider, which forms one piece with the second element, or itself constitutes that element, may be adjusted into position. This may, for example, be the arrangement used for adjusting the forward positioning or the lateral inclination of a boot shaft jointed to a rigid shell base, or for adjusting the forward or rearward flexion characteristics of this shaft in relation to the shell base.

Thus, French Patent Application No. FR 2 480 575 describes a device in which a guidetrack incorporates on each side a system of notches which cooperates with a pawl system carried by the slider which is spring-activated, so as to fix the relative positions of the slider and the slide-track. Although the fixing of position thus obtained is satisfactory in most cases of use, the boot is not definitively locked in that position, and an untimely shock exerted in the direction of the guidetrack is liable to change the adjustment position if the threshold for activation of the spring is exceeded.

SUMMARY OF THE INVENTION

By locking the device definitively into position, the skier may avoid such annoyances, thus demonstrating the invention's usefulness. This is the objective that the present invention proposes to achieve.

Although not limited to ski boots, the invention is described in the following text with reference to the adjustment of the angle of forward positioning of the shaft of a boot opening toward the front, this shaft being jointed onto an inflexible shell base, and with reference to the adjustment of the forward-flexion stiffness of the shaft of a rear entry.

BRIEF DESCRIPTION OF THE DRAWINGS

The invention will now be described with reference to the accompanying drawings, wherein several embodiments are shown for purposes of illustration, and wherein:

FIG. 3 shows a detail of a longitudinal, vertical partial section of FIG. 1;

FIGS. 4A and 4B represent, in longitudinal section in relation to the guide-track (plane B—B in FIG. 4B) and in section along plane A—A in FIG. 4A respectively, an embodiment of a device according to the invention in the locked position;

FIGS. 4C and 4D correspond to FIGS. 4A and 4B, respectively, and show the device in open position ready for adjustment; and FIGS. 5A to 5D, corresponding to FIGS. 4A to 4D, show a second embodiment of a device according to the invention.

DESCRIPTION OF THE PREFERRED EMBODIMENTS

Figure 1:
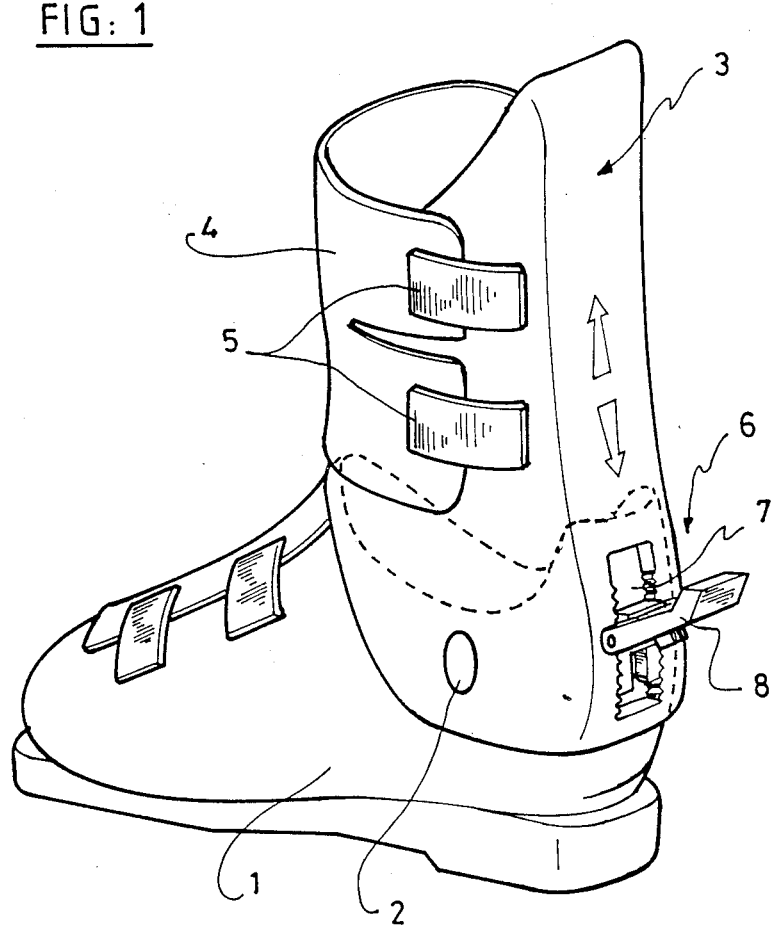
FIG. 1 shows in perspective a front entry boot in which the invention is applied according to the first embodiment described above.

The ski boot shown in FIG. 1 comprises, in a well-known arrangement, a rigid shell base onto which is hinged, at least partially around a transverse axis, a shaft comprising a rear cover 3 and a sleeve 4. The sleeve 4 opens toward the front in relation to the rear cover, allowing the entry of the skier's foot, and closes over the lower leg, using closing devices 5. This boot is equipped with a device 6 according to the invention which regulates the forward movement or the angle of forward inclination in relation to the vertical of the shaft 3, 4. This regulation is achieved by adjusting the relative positions of the shell base and of the rear cover 3 which is jointed around the axis 2.

To accomplish this adjustment, as illustrated in FIGS. 1, 3, and 4A to 4D, a guidetrack 7, whose axis lies in a substantially vertical plane, is cut into the rear cover 3. A slider 8, forming one piece with the shell base by any appropriate means, may be moved along the guidetrack, which thus causes the rear cover 3 to pivot about the transverse axis 2; the slider may also be locked into position.

The slider 8 comprises a body 81 comprising two flexible arms 82, 83 approximately parallel to the axis of the guidetrack 7, whose outer edges cooperate with the edges 72, 73 of the guidetrack 7 by coming into lateral contact with these edges. The body 81 has mounted on it a control lever 9 which is pivotable around an axis 91 parallel to the general plane of the guidetrack 7 and perpendicular to its general direction. In the area of the axis 91, the lever 9 is formed in a conventional manner, so as to obtain a toggle-lever effect providing two stable positions, locked ( FIGS. 4A and 4B) and unlocked (FIGS. 4C and 4D).

On the surface facing the guidetrack 7, the lever 9 has a projection 92 whose width matches the gap separating the internal edges of the two flexible arms 82, 83. In the locked position, this projection 92 holds the two arms 82, 83 in contact against the inner edges 72, 73 of the guidetrack 7, in order to ensure the positive immobilization of the slider in relation to the guidetrack 7. The projection 92 may have an advancing profile which facilitates its positioning between the arms 82, 83 and the exertion of pressure which increases until the final locking position is achieved.

The outer edges of the flexible arms 82, 83 may be flat, as are the inner edges 72, 73 of the guidetrack 7. In this case, the pressure of the contact in the locked position must be sufficient to ensure immobilization of the device. It will, however, be understood that the coefficients of friction, like wear and tear over time, may cause problems. An advantage will thus be gained by providing, on at least one of the arms 82, 83 and on the corresponding inner edge 72, 73 of the guidetrack, non-flat complementary forms which fit together in interlocking fashion at the moment when locking occurs. FIGS. 4A through 4D thus show a device having uniform notches 10 in the form of serrations which mesh perfectly with the locking mechanism and also form adjustment steps.

Another proposed arrangement is shown in FIGS. 5A to 5D, according to which longitudinally spaced grooves 11 are cut in the inner flat edges 72, 73 of the guidetrack in which grooves fits a projection 12 of corresponding shape on the outer surface of the flexible arms 82, 83. During adjustment, the slider moves more easily in the guidetrack as it encounters resistance at each position of adjustment; since the user senses this resistance, the adjustment of position before locking of the mechanism is made easier.

Other complementary shapes may obviously be considered according to this principle.

Figure 2:
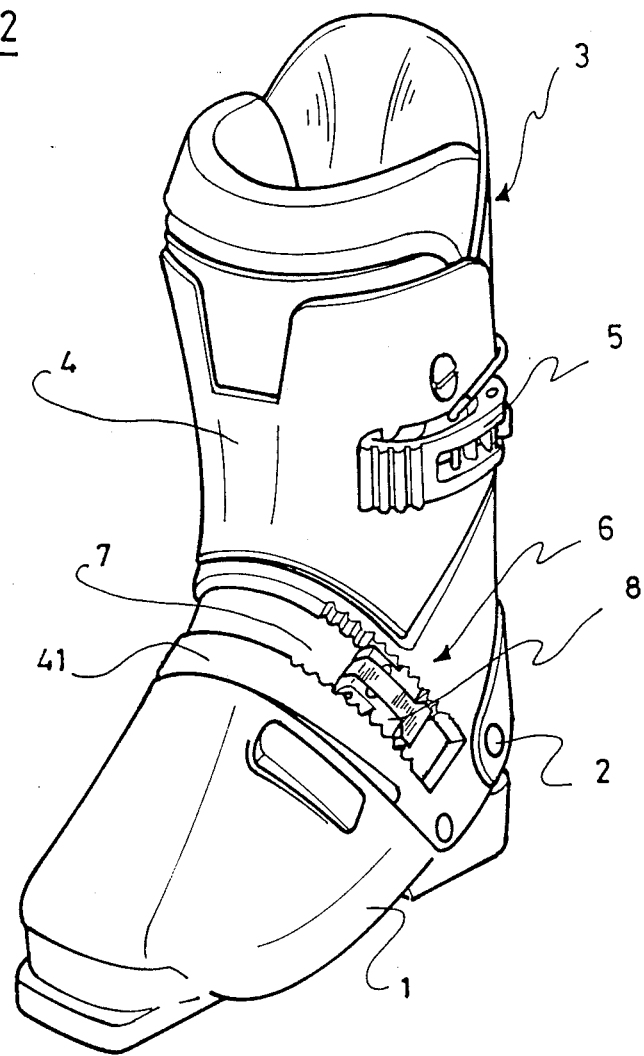
FIG. 2 shows in perspective a rear entry boot illustrating the application of the invention according to the second embodiment described above.

Everything that has been said concerning the device for adjustment of the relative position of the two devices with reference to the embodiment shown in FIG. 1, is, mutatis mutandis, valid for the implementation shown in FIG. 2, with the exception of a few details:

In this case, the invention applies to a rear-entry boot. This time, it is the rear cover 3 which opens to receive the foot and which closes over the sleeve 4 jointed at 2 onto the shell base 1. The forward-flexion stiffness of the sleeve 4 is adjusted using a device having a slider 6, according to the principle enunciated, for example, in French Patent Application No. FR 2 480 575 already mentioned. In FIG. 2, the slider 8 acts as a stop for the transmission of the force of flexion between the sleeve 4 and a flexion plate 41 which may be unitary with the sleeve 4. The guidetrack 7 previously described matches the space separating the sleeve itself 4 from the flexion plate 41. Adjustment of stiffness is accomplished by varying the position of the slider 8 (which, in this case, is not unitary with any other part of the boot) along the guidetrack.

From the preceding description, the skilled workman may conclude that, by simple transposition, other uses and embodiments of the device may be considered, as they relate both to ski boots and to other technical applications.

What is claimed is:

1. Device for the adjustment of the relative positions of two elements, a first of said elements being unitary with a guide track, and a second of said elements being unitary with a slider which is movable within and along said guide track, wherein said slider comprises two flexible arms at least substantially parallel to said guide track, each one of said arms enters laterally into contact with one side of the guide track and a control and locking lever jointed onto the slider about an axis which is parallel to a general plane of said flexible arms and perpendicular to their general direction, and wherein said lever further comprises a projection which, for the purpose of immobilizing the slider in position, fits between said two flexible arms so as to hold them laterally against said guide track when said lever is set in locked position, and which is withdrawn from between said flexible arms when said lever is placed in unlocked position.

2. Device according to claim 1, wherein the outer surfaces of said flexible arms cooperate with edges of said guide track, and wherein said edges are flat.

3. Device according to claim 1, wherein an outer surface of at least one of said flexible arms and a corresponding edge of said guide track are provided with complementary shapes which interlock together in the locked position of said lever.

4. Device according to claim 3, wherein said complementary shapes are serrations.

5. Device according to claim 3, wherein said complementary shapes are, respectively, grooves and projections spaced in the direction of said guide track.

6. Device according to claim 1, mounted on a ski boot in order to regulate operating characteristics of said ski boot.

7. Device according to claim 6, wherein said ski boot is of the rear-entry type and said device is adapted to adjust forward positioning of a shaft of said ski boot.

8. Device according to claim 7, wherein said slider forms one piece with a shell base of said ski boot and said guide track forms one piece with a rear cover forming part of said shaft jointed onto said shell base.

9. Device according to claim 6, wherein said ski boot is of the front-entry type, and wherein said device is adapted to adjust flexion stiffness of said shaft.

10. Device according to claim 9, wherein said guide track is carried by a sleeve of said shaft and by a flexion plate, and wherein said slider acts as an adjustable stop between said sleeve and said flexion plate.

* * * * *